– Fig. 1 –

INVENTOR
Louis Joseph Libois
By: Hazeltine, Lake & Co.
AGENTS

May 22, 1951 L. J. LIBOIS 2,554,112

MULTIPLEX TRANSMISSION SYSTEMS BY MEANS OF ELECTRICAL IMPULSES

Filed Dec. 4, 1948 3 Sheets-Sheet 2

INVENTOR
LOUIS JOSEPH LIBOIS
By: Haseltine, Lake & Co.
AGENTS

Inventor
Louis J. Libois
By Haseltine, Lake & Co.
Agents

Patented May 22, 1951 2,554,112

UNITED STATES PATENT OFFICE 2,554,112

MULTIPLEX TRANSMISSION SYSTEM BY MEANS OF ELECTRICAL IMPULSES

Louis Joseph Libois, Paris, France

Application December 4, 1948, Serial No. 63,536
In France December 18, 1947

7 Claims. (Cl. 250—27.1)

The present invention relates to multiplex communication systems employing electrical pulses. More particularly, its object is an improvement in method and apparatus for demodulating, at the receiving end of such a communication system, signals constituted by trains of pulses modulated by displacement of their positions in time, generally known as "pulse time modulated signals."

In a known method of demodulation, time modulated pulses are demodulated by first comparing them, by means of a suitable electronic equipment, with a predetermined fixed and recurrent time interval, defined by a local pulse generator which, if necessary, may be synchronized by certain of the incoming signals. The variable portion of the modulated pulse which coincides with the said fixed time interval constitutes a duration (or width) modulated pulse which can be further demodulated by conventional methods.

Practical application of this known method is obviously subject to a limitation. The limits of the predetermined fixed time interval should be such that one of the edges of the modulated pulse be always included within this interval while the other edge should constantly remain outside. This condition imposes upon the displacement of the modulated pulse a maximum value within the limits of the pulse duration (the displacement being measured from one extreme position to the other). It is often convenient, however, to use pulses distinctly shorter than their maximum displacement (for instance by reason of an economy in power). In this case, the above mentioned method can still be used provided that, before their final demodulation, the modulated pulses are first lengthened, by any suitable means, to a duration exceeding slightly their maximum displacement. This lengthening process can obviously be applied to a whole multiplex system only if the time interval assigned to each channel is at least equal to twice the maximum displacement of one pulse, otherwise there would be a mixing of signals pertaining to adjacent channels. This condition is costly since it neutralizes in the form of a "guarding time" half of the time available for the transmission. Such a drawback could be obviated, of course, by first separating the various channels and thereafter applying individually the lengthening process to each channel. This solution, however, is uneconomical, as it involves electronic lengthening equipments equal in number to the channels.

The main object of the present invention is to provide a more economical solution for this problem, while keeping the same known method of demodulation. The method according to the invention as applied in the case of a multiplex communication system using time modulated pulses of short duration succeeding one another without any additional guarding time, takes advantage of the fact that it is possible to apply the lengthening process, merely by making the time available for each channel at least equal to twice the maximum corresponding pulse displacement, any further additional time being useless. The latter condition, therefore, can be fulfilled by first separating the modulated pulses into two groups, on one side the odd numbered pulses, and on the other side the even numbered pulses, and then operating with each one of said groups separately, first by lengthening the pulses of one group as a whole, then by separating the various channels and demodulating them according to the known method mentioned above.

It is clear that the suppression of one pulse out of two in each one of the groups considered is equivalent to providing an additional guarding time exactly equal to the maximum time displacement of the pulses.

From what has just been explained, it follows that an essential part of any apparatus for putting in practice the method according to the invention is a pair of selectors for separating the odd from the even numbered pulses. The function of these selectors is to direct the odd or even numbered pulses, alternatively, towards their respective lengthening circuits. The operation of the selectors should be synchronized by the incoming signals according to any one of the known methods.

In a possible embodiment of the invention, two selectors of identical construction can be used, each one of them being made successively operative at recurrent time intervals by alternate "selection signals" synchronized from the incoming signals. In a modification of the apparatus which constitutes a preferred embodiment of the invention, two identical selectors actuated by the same selection signals are used, the separation in time of the odd and even numbered groups of communication pulses being secured by delaying all these pulses, by means of a delay network, by a time equal to that normally allocated to one communication channel, before impressing them upon the input of one of the two group selectors, while the whole of the same pulses is applied, without any delay, to the input of the second group selector. The advantage of the latter solution is that it is more economical as it saves one tap out of two on the pulse distributor used later in the demodulation equipment for comparing the time modulated pulses with fixed, predetermined intervals, as explained above.

This preferred embodiment of the invention will now be described in greater detail, by way of example, and without thereby limiting the scope of the invention.

The invention will be more readily understood when reference is made to the accompanying drawings given by way of example and wherein:

Figure 1 shows, schematically, an example of application of means according to the invention to a system of communication time modulated pulses, the number of channels being limited to six to facilitate the explanation.

The equipment is represented from the general clipping amplifier acting on the complete pulse assembly to the individual demodulators of the six channels. While this limiting amplifier is no essential part of the invention, its use is advisable as it is the case in most communication systems employing pulses.

Figure 1:
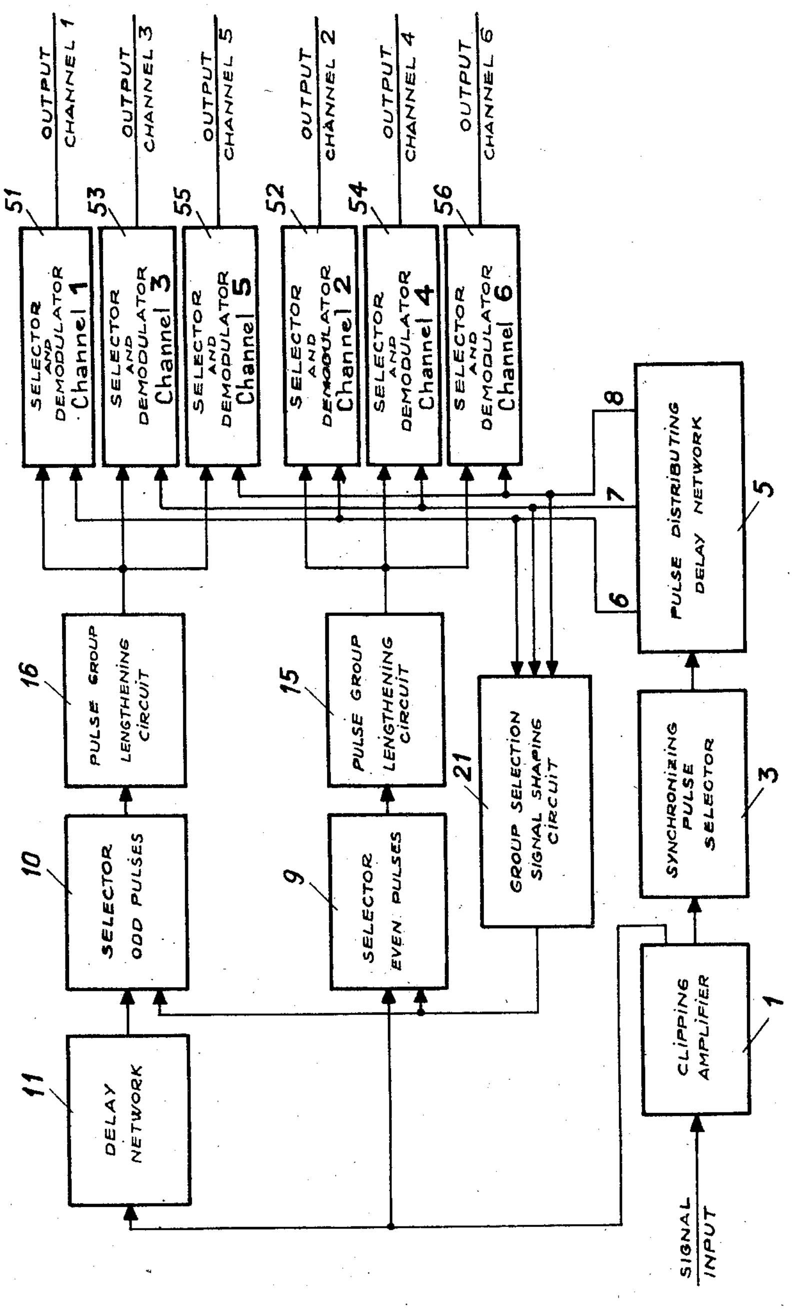
Figure 2:
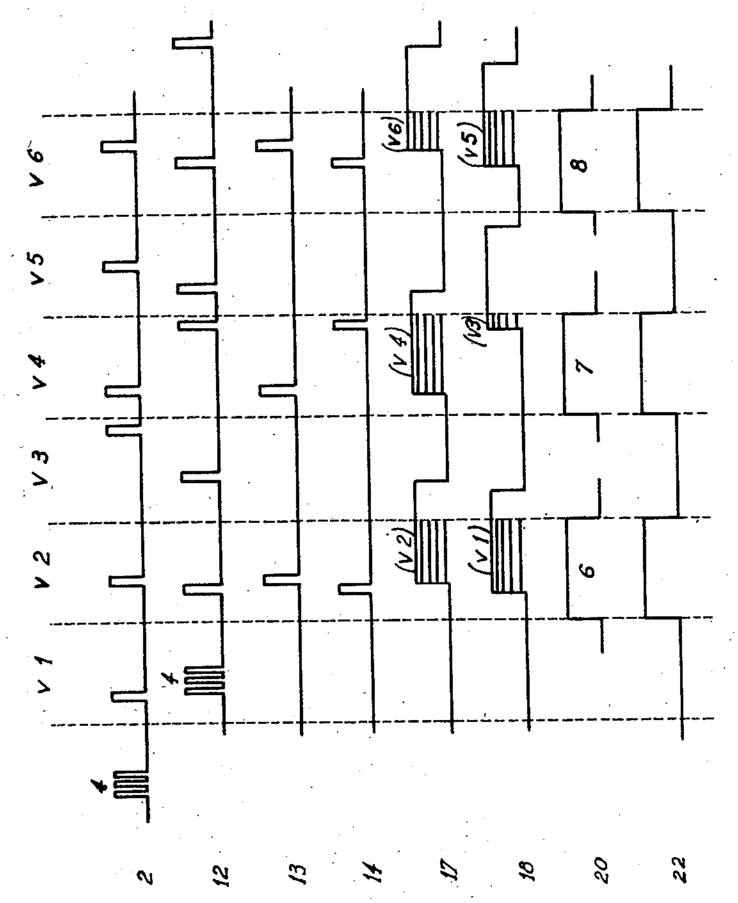
Figure 2 shows signal diagrams relating to the operation of the circuits of Figure 1.

The operation of the equipment is as follows:

The incoming signals, after passing through the general clipping amplifier 1, shown in Figure 1, have the shape shown at 2, Figure 2. The vertical dotted lines on Figure 2 show the limits of the time intervals allocated to the various transmission channels shown in the drawings as V.1 to V.6.

The synchronizing or pilot pulse selector 3 has for its purpose the separation from the other pulses of the pilot signal which is represented (at 4, Figure 2) by a group of three short successive pulses.

This selector 3 controls the channel selection pulse distributor shown at 5 which has three separate outputs marked 6, 7 and 8 on Figure 1.

The signals issuing from 1 are also directed towards the even and odd pulse selectors after having been, however, delayed in the circuit 11 for the case of the odd pulse selector 10 (the signals thus delayed can be seen at 12, Figure 2).

The signals obtained at the output from selectors 9 and 10 are represented at 13 and 14 (Figure 2) and, after lengthening in the circuits 15 and 16, they become such as represented on the diagrams 17 and 18 (Figure 2).

The latter signals are respectively applied to two groups each of three channel selector-demodulators indicated on Figure 1 by references 51 to 56, each one of said selector-demodulators being provided on one hand with terminals for applying to it said signals from 15 or 16, and, on the other hand, with other terminals for applying to it the selection signals issued from the pulse distributor 5, at 6, 7 and 8.

It must be understood that each one of these six channel selector-demodulators includes means for comparing the incoming modulated pulses with a predetermined fixed time interval defined by the selection signals, means for deriving, from the comparison of said incoming modulated pulses with said time interval, a duration modulated pulse and means for impressing the signals obtained, after demodulation, upon the channel output circuit. Such selector-demodulators are well known in the art. Their operation is based on the "gating" of the incoming pulses through an electronic circuit actuated by auxiliary recurrent pulses of constant phase and duration, whereby the incoming time modulated pulses are transformed into duration (or width) modulated pulses, whose demodulation is easily accomplished by conventional circuits.

It can be seen on the Figure 1 that each one of the outputs 6, 7 and 8 from the pulse distributor 5 supplies, at the same time an odd channel selector and the selector for the even channel which follows it immediately in the transmission.

The selection signals are represented at 20, Figure 2, with the indices corresponding to the outputs shown in Figure 1.

These signals, further, are mixed in the shaping circuit 21 to form the signal 22 of Figure 2 used in the elements 9 and 10 for the selection of the even and odd channel groups.

Figure 3:
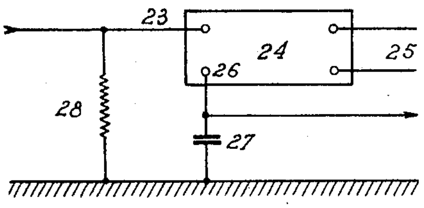
Figure 3 shows an example of a circuit effecting the lengthening of the pulses.

Figure 3 shows, by way of example, a circuit using a delay line capable of lengthening a short pulse to a constant predetermined time.

In Figure 3 the incoming signal is applied at 23 to the input of the delay line 24 which is left open at its other end 25.

The input line terminal 26, opposite the input 23 is connected to the earth through a capacitor 27 chosen of a high value with respect to that of the capacitors included in the line 24.

The resistor 28 constitutes, in series with this capacitor 27, the termination at its input end of the line, which is also the effective terminal end of the line for the signals which, after arriving at 23 and being reflected at 25 finally come back to 23. The value of this resistor should be equal to the characteristic impedance of the line 24 so as to avoid any further reflection of the signals (the reactive impedance due to the capacity 27 being ignored for the time being).

The lengthened pulse is collected at 26.

Figure 4:
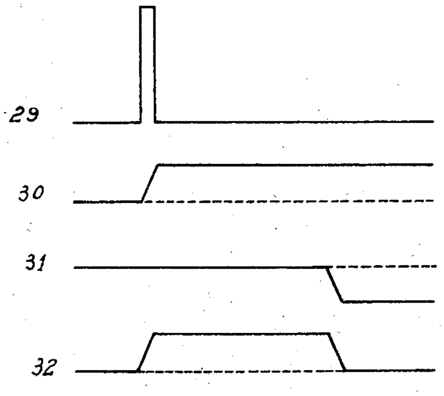
Figure 4 is a diagram used in the explanation of the operation of the circuit of Figure 3.

The operation of the circuit of Figure 3 will be better understood with reference to the signal diagrams of Figure 4 which show:

At 29, the short pulse applied at 23;

At 30, the signal produced at 26 by integration of the incoming signal at the terminals of capacitor 27;

At 31, the signal produced at the same point 26 by integration of the signal which has come back to the input of the line after reflection at 25 and going through the capacitor 27 in the opposite direction;

At 32, the signal resulting from the combination of 30 and 31 at point 26 and composed of a trapezoidal pulse having a mean duration equal to the time for the back and forth propagation on the line 24.

The effects of the cut-off frequency of the line 24, as well as those caused by the attenuation of the signals in the reflected propagation and also the consequences of the extraneous reflections of the signals at the input of the line due to its incorrect termination (reactive term due to the capacity 27), are neglected here.

Except for that, the edges of the pulse 32 have a duration approximately equal to the total duration of the incoming pulse.

In most cases, these various effects do not impair the use of the signal 32 which will be benefited, for example, by a clipping operation which improves its shape and decreases the duration of its edges.

Figure 5:
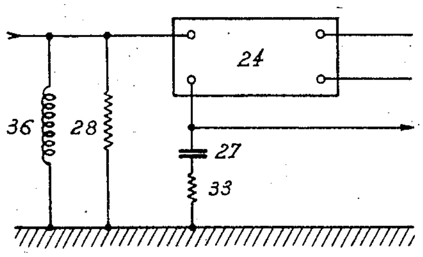
Figure 5 is a modification of the circuit shown in Figure 3.

The circuit described, however, may be improved by the addition of certain elements. A circuit thus improved is shown in Figure 5 wherein are found, in addition to the elements of the first circuit, a resistor 33 and an inductance 36.

Figure 6:
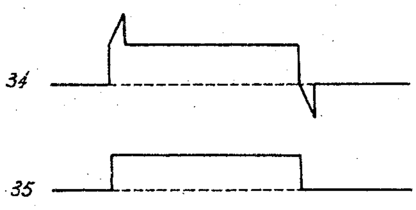
Figure 6 is a diagram used in the explanation of the operation of the circuit of Figure 5.

The resistor 33 will introduce into the outgoing signal unintegrated components of the incoming signal, so as to make the fronts steeper, the signal obtained being represented at 34, Figure 6, giving after clipping the signal 35 in the same figure.

The inductance 36 in parallel with the resistor 28 is calculated to cancel, to a certain extent, the reactive term due to the capacity 27 in the termination of the line 24.

It is possible, by way of example, to give values for the calculation which may be used to determine the circuit elements and predict the results on the signals obtained.

Let:

Z be the characteristic impedance of the line 24
R the value of resistor 28
$r$ the value of resistor 33
C the capacity of capacitor 27
T the duration of the short incoming pulse (29, Fig. 4)
$\theta$ the delay time, back and forth of the line (which is also the mean duration of the signal 32, Fig. 4, or 35, Figure 5)
V the peak voltage of the incoming pulse (29)
$v$ the voltage of the horizontal portion of the resultant pulse (32, 35).

A suitable value for C will consist in making it equal to the sum of all the capacities constituting the line 24, counted twice, (once west to east and once east to west) which leads to:

$$C=\frac{\theta}{Z}$$

from which $$v=\frac{VT}{\theta}$$

The resistor 33 will thus have approximately a value:

$$R=\frac{ZT}{\theta}$$

To obtain the best termination for the line, it is thus necessary to give the resistor 28 the value $$R=Z-r=Z\frac{\theta-T}{\theta}$$

and, for the inductance 34 the value $L=CRZ$, i. e. approximately $Z\theta$.

It is quite obvious that the embodiments described have been given only by way of examples and that they are capable of numerous modifications and variants within the scope of the invention.

What is claimed is:

1. In a multiplex communication system including a plurality of communication channels multiplexed in time division and using recurrent electrical pulses modulated by displacement of their positions in time, a method for separating and demodulating said communication channels at the receiving end of said system; said method comprising separating the incoming modulated pulses into two groups, one of said groups including all pulses pertaining to communication channels of even rank and the other group all pulses pertaining to communication channels of odd rank, lengthening in a common circuit the pulses of each group up to a duration slightly shorter than the time allotted to two successive communication channels, and separating and demodulating pulses pertaining to different channels in each group.

2. In a multiplex communication system including a plurality of communication channels multiplexed in time division and using recurrent electrical pulses modulated by displacement of their positions in time, a device for separating and demodulating said channels at the receiving end of said system, said device comprising a synchronizing pulse selector, a pulse distributing delay network, means for controlling said pulse distributing network by the output of said synchronizing pulse selector, a shaping circuit deriving from the output of said pulse distributing network group selection signals having the form of series of pulses of a duration coinciding in time with the time allotted to a group of communication channels comprising either all channels of even rank or all channels of odd rank, a pair of group selectors, means for controlling said group selectors by said group selection signals, means for applying incoming modulated pulses to the input of one of said group selectors, means for applying incoming modulated pulses through a delay network to the input of the other group selector, said delay network having a delay time equal to the time normally allotted to one communication channel, electronic lengthening circuits for lengthening modulated pulses received at the output of said group selectors, channel selectors and demodulators in number equal to that of the communication channels and fed, on the one hand, by said lengthened modulated pulses and, on the other hand, by channel selection pulses from said pulse distributing network, and means for impressing demodulated signals from said demodulators upon working circuits.

3. A device as in claim 2, wherein each lengthening circuit comprises a capacitor and an associated delay line, said capacitor having a capacity at least equal to twice the total capacity of said line, said capacitor being adapted to be charged by the application of a pulse thereto and discharged by the return thereto of the said pulse after its having been reflected at one end of said delay line, the total propagation time of said line being equal to the required lengthening of said pulses.

4. A device as in claim 2, wherein the lengthening circuit comprises a capacitor and an associated delay line, said capacitor having a capacity at least equal to twice the total capacity of said line, said capacitor being adapted to be charged by the application of a pulse thereto and discharged by the return thereto of the said pulse after its having been reflected at one end of said delay line, the total propagation time of said line being equal to the required lengthening of said pulses, and further including a first resistor series-connected with said capacitor and a circuit comprising an inductance and a parallel-connected resistor, said circuit being connected in parallel with said delay line, capacitor and first resistor to improve the termination characteristics of said delay line.

5. In a multiplex communication system including a plurality of communication channels multiplexed in time division and using recurrent electrical pulses modulated by displacement of their positions in time, a device for separating and demodulating said channels at the receiving end of said system, said device comprising a synchronizing pulse selector, a pulse distributing delay network, means for controlling said pulse distributing network by the output of said synchronizing pulse selector, a shaping circuit deriving from the output of said pulse distributing network two series of group selection signals having the form of series of pulses of a duration coinciding respectively in time with the times allotted to a group of communication channels comprising all channels of an even rank and to a group of communication channels comprising all channels of an odd rank, a pair of group selectors, means for controlling each one of said group selectors by one of the above mentioned series of group selection signals, separate means for applying incoming modulated pulses to the input of each of said group selectors, electronic lengthening circuits for lengthening modulated pulses received at the output of said group selectors, channel selectors and demodulators in number equal to that of the communication channels and fed, on the one hand, by said lengthened modulated pulses and, on the other hand, by channel selection pulses from said pulse distributing network, and means for impressing demodulated signals from said demodulators upon working circuits.

6. A device as in claim 5, wherein each lengthening circuit comprises a capacitor and an associated delay line, said capacitor having a capacity at least equal to twice the total capacity of said line, said capacitor being adapted to be charged by the application of a pulse thereto and discharged by the return thereto of the said pulse after its having been reflected at one end of said delay line, the total propagation time of said line being equal to the required lengthening of said pulses.

7. A device as in claim 5, wherein the lengthening circuit comprises a capacitor and an associated delay line, said capacitor having a capacity at least equal to twice the total capacity of said line, said capacitor being adapted to be charged by the application of a pulse thereto and discharged by the return thereto of the said pulse after its having been reflected at one end of said delay line, the total propagation time of said line being equal to the required lengthening of said pulses, and further including a first resistor series-connected with said capacitor and a circuit comprising an inductance and a parallel-connected resistor, said circuit being connected in parallel with said delay line, capacitor and first resistor to improve the termination characteristics of said delay line.

LOUIS JOSEPH LIBOIS.

REFERENCES CITED

The following references are of record in the file of this patent:

UNITED STATES PATENTS

| Number | Name | Date |
|---|---|---|
| 2,086,918 | Luck | July 13, 1937 |
| 2,429,616 | Grieg | Oct. 28, 1947 |
| 2,433,379 | Sevey et al. | Dec. 30, 1947 |
| 2,462,100 | Hollabaugh | Feb. 22, 1949 |
| 2,462,110 | Levy | Feb. 22, 1949 |
| 2,462,111 | Levy | Feb. 22, 1949 |

FOREIGN PATENTS

| Number | Country | Date |
|---|---|---|
| 585,827 | Great Britain | Feb. 26, 1947 |